United States Patent Office 3,345,368
Patented Oct. 3, 1967

3,345,368
SUBSTITUTED 7-ACETYLAMINO
CEPHALOSPORANIC ACIDS
Benjamin Arthur Lewis, Suffern, and Martin Leon Sassiver, Pearl River, N.Y., and Robert Gordon Shepherd, Ridgewood, N.J., assignors to American Cyanamid Company, Stamford, Conn., a corporation of Maine
No Drawing. Filed Feb. 15, 1967, Ser. No. 616,177
10 Claims. (Cl. 260—243)

ABSTRACT OF THE DISCLOSURE

This disclosure describes compounds of the class of 7-[bis-(alkylthio)alkanoylamino]cephalosporanic acids, 7-(dithioalkanoylamino)cephalosporanic acids and 7-(2-alkyl-4,m-dithianealkanoylamino)cephalosporanic acids; useful as antibacterial agents.

Brief summary of the invention

This invention relates to new derivatives of 7-aminocephalosporanic acid and, more particularly, is concerned with novel compounds which may be represented by the following general formulae:

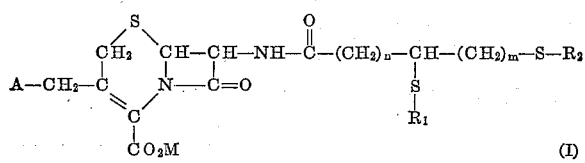
(I)

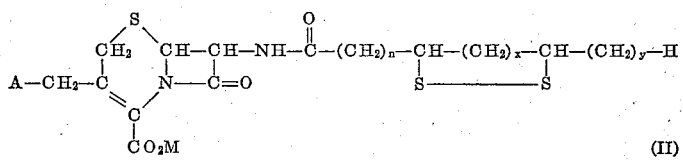
(II)

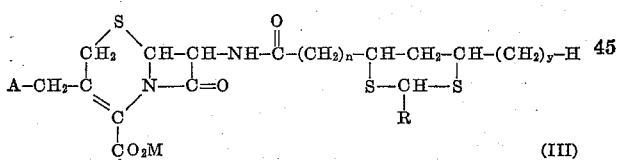
(III)

wherein R is lower alkyl, $R_1$ and $R_2$ are lower alkyl or phenyl lower alkyl, $n$ is 3 or 4, $m$ is 2 or 3, $x$ is 1 or 2, $y$ is 0 or 1, A is acetoxy or N-primidinium and M is hydrogen, pharmaceutically acceptable non-toxic cations or an anionic charge when A is N-pyridinium. Suitable lower alkyl groups are those having from 1 to 4 carbon atoms such as methyl, ethyl, isopropyl, n-butyl, etc. Suitable phenyl lower alkyl groups are, for example, benzyl, β-phenylethyl, α-phenylethyl, and the like.

Detailed description of the invention

In the general Formulae (I), (II) and (III) set forth above, in those instances where A is N-pyridinium, the cationic charge on this group is matched by the anionic charge of the carboxylic acid radical, the entire molecule being of a zwitterion nature and M is thus an anionic charge. Typical bis-(alkylthio)alkanoyl groups contemplated by the present invention are 6,8-bis-(methylthio) octanoyl, 6-methylthio-8-ethylthiooctanoyl, 5,8-bis-(ethylthio)octanoyl, 5-ethylthio-7-methylthioheptanoyl, 6,9-bis-(isopropylthio)nonanoyl, 6,8-bis-(benzylthio) octanoyl, 6,8-bis-(ethylthio)octanoyl, etc. Typical dithioalkanoyl groups contemplated by the present invention are, for example, 5,8-dithiooctanoyl, 6,8-dithiooctanoyl, 6,8-dithiononanoyl, and the like. Typical 2-alkyl-4,m-dithianealkanoyl groups contemplated by the present invention are 2-methyl-4,m-dithianepentanoyl, 2-ethyl-4,m-dithianebutanoyl, etc.

Also embraced within the scope of the present invention are the non-toxic pharmaceutically acceptable salts of these derivatives of 7-aminocephalosporanic acid. The cations comprised in these salts and embraced by M include, for example, the non-toxic metal cations such as the sodium ion, potassium ion, calcium ion, magnesium ion as well as the organic amine cations, such as the tri(lower alkyl)amine cations (e.g. triethylamine), procaine, and the like.

The novel compounds of the present invention, when A is acetoxy in Formulae (I), (II) and (III) above, may be readily prepared by acylating 7-aminocephalosporanic acid with a compound which may be represented by the following general formulae:

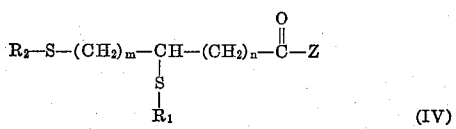
(IV)

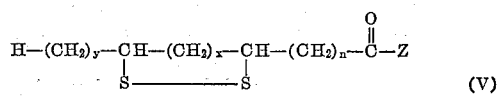
(V)

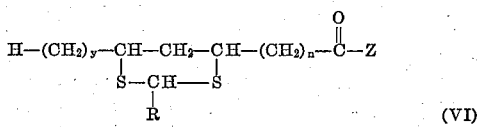
(VI)

wherein R, $R_1$, $R_2$, $n$, $m$, $x$ and $y$ are as hereinbefore defined and Z is a halide (preferably chloride), azide, acyloxy or p-nitrophenoxy group. This acylation of the 7-aminocephalosporanic acid is performed, for example, by the Schotten-Baumann method, taking into consideration the sensitivity of these compounds, under mild conditions and advantageously in the presence of a diluent or solvent such as water or an organic solvent, for example, a ketone such as acetone, an ether such as tetrahydrofuran, or a halogenated hydrocarbon such as chloroform or methylene chloride. The reaction is preferably conducted in the presence of a basic agent such as sodium bicarbonate or potassium bicarbonate, or an organic base such as one of the organic bases listed hereinbefore. The reaction is also preferably carried out at a temperature of from about 0° C. to about 25° C., preferably at 0° C.–5° C.; and over a period of time of a few hours or more.

The acylating agents corresponding to the Formulae (IV), (V) and (VI), when new, may be prepared by methods well-known in the art from the corresponding acids (Z is hydroxy). Thus, the acid can be treated with thionyl chloride or oxalyl chloride, if desired in the presence of dimethylformamide, to yield the corresponding acyl chlorides (Z is chlorine), which, if desired, can be converted to the acyl azides (Z is N$_3$) by treatment with sodium azide. The p-nitrophenyl esters (Z is p-nitrophenoxy) can be prepared by following the procedure of Bodanszky et al. (Biochemical Preparations, vol. 9, p. 110, 1962, John Wiley and Sons, New York, N. Y.). Specific acylating agents operable in this process include, for example, 6,8-bis-(methylthio)octanoyl chloride, 6-methylthio-8-ethylthiooctanoyl bromide, 5,8-bis-(ethylthio)octanoyl azide, p-nitrophenyl 6,9-bis-(isopropylthio)nonanoate, 6,8-bis-(benzylthio)octanoyl bromide, p-nitrophenyl 5,8-dithiooctanoate, 6,8-dithiooctanoyl azide, 6,8-dithiononanoyl bromide, 2-methyl-4,m-dithianepentanoyl chloride, 2-ethyl-4,m-dithianebutanoyl chloride, and the like.

The novel compounds of the present invention, when A is N-pyridinium in Formulae (I), (II) and (III) above, may be readily prepared from the corresponding 7-aminocephalosporanic acid derivatives (A is acetoxy in Formulae (I), (II) and (III) above) by treatment with pyridine in water or aqueous acetone at 20°–50° C. and for a period of time of about 1–3 days. The resulting 3-(1-pyridylmethyl)-3-cephem-4-carboxylic acid betaines may then be isolated by standard procedures of precipitation and crystallization.

Depending on the reaction condition used, the new compounds of the present invention are obtained in the free form or in the form of their salts. From the salts it is possible to prepare the acids in known manner, or from the acids the salts are readily accessible, for example, by reaction with hydroxides, carbonates or bicarbonates of alkali metals or alkaline earth metals, or with organic amines.

The novel compounds of the present invention are biologically active and have been found to possess antibacterial activity. As indicated, they are useful antimicrobial agents and have high antimicrobial activity in vitro against standard laboratory microorganism used to screen for activity against pathogens. The antibacterial spectrum of typical compounds of the present invention, representing the concentration required to inhibit the growth of various typical bacteria, was determined in a standard manner by the agar-dilution streak-plate technique which is commonly used in testing new antibiotics. The following table summarizes the in vitro activity of 7 - [6,8-bis-(methylthio)octanoylamino]cephalosporanic acid (1), 7-(5,8-dithiooctanoylamino)cephalosporanic acid (2), 7-(6,8-dithiooctanoylamino)cephalosporanic acid (3), 7-(6,8-dithiononanoylamino)cephalosporanic acid (4), 7 - (2 - methyl - 4,m-dithianepentanoylamino) cephalosporanic acid (5) and 7-[6,8-bis-(benzylthio)-octanoylamino]cephalosporanic acid (6) as compared with Cephalosporin C (7) against a variety of disease-causing microorganisms.

| Organism | Minimal inhibitory conc. (mcg./ml.) | | | | | | |
|---|---|---|---|---|---|---|---|
| | (1) | (2) | (3) | (4) | (5) | (6) | (7) |
| Staphylococcus aureus No. 11 | 12.5 | 0.78 | 6.25 | 6.25 | 25 | 50 | 100 |
| Staphylococcus aureus ATCC 13709 | 0.39 | 0.1 | 31.2 | 1.56 | 6.25 | 25 | 50 |
| Streptococcus pyogenes C-203 | 0.2 | 0.1 | 0.78 | 0.2 | 3.12 | 12.5 | 25 |
| Bacillus cereus ATCC 10702 | 6.25 | 0.39 | 3.12 | 3.12 | 25 | 25 | 100 |

The compounds of the present invention retained antibacterial activity after exposure to cephalosporinase, a bacterial enzyme, which completely destroyed the activity of Cephalosporin C under the same conditions.

The high in vitro antibacterial activity of the novel compounds of the present invention makes them useful as additives to materials which are subject to microbial deterioration such as cutting oils and fuel oils. They are also useful in soaps, shampoos and topical compositions for the treatment of wounds and burns.

The invention wil be described in greater detail in conjunction with the following specific examples.

EXAMPLE 1

*Preparation of 7-[6,8-bis-(methylthio)octanoylamino]cephalosporanic acid*

6,8-bis-(methylthio)octanoic acid (472 mg., 2 mmole) is converted to its acid chloride with oxalyl chloride. The acid chloride in acetone (20 ml.) is added to a stirred solution of 7-aminocephalosporanic acid (545 mg., 2 mmole) and sodium bicarbonate 504 mg., 6 mmole) in water (40 ml.) and acetone (20 ml.) which is kept between 0° C. and 5° C. The reaction is stirred for 2 hours at this temperature, and then the acetone is removed under reduced pressure. The aqueous solution is acidified to pH 1 with hydrochloric acid and the mixture extracted with ethyl acetate (3×50 ml.) the ethyl acetate solution is washed with water (100 ml.) and dried over magnesium sulfate. Evaporation of the solvent under reduced pressure gives 7-[6,8-bis-(methylthio)octanoylamino]cephalosporanic acid. The sodium salt is obtained by slurrying this product in water (10 ml.) and adding 2 N sodium hydroxide dropwise to pH 5 to effect solution. The solution is concentrated to a small volume in a rotary evaporator at <50° C., and the sodium salt is precipitated by the addition of acetone. The precipitate is collected by filtration and dried to give 360 mg. of sodium 7 - [6,8 - bis-(methylthio)octanoylamino]cephalosporanate as an ivory solid.

EXAMPLE 2

*Preparation of 7-[6,8-bis-(ethylthio)octanoylamino]cephalosporanic acid*

By replacing the 6,8-bis-(methylthio)octanoyl chloride employed in Example 1 with an equimolecular quantity of 6,8-bis-(ethylthio)octanoyl bromide and following substantially the same procedure described in Example 1, there is obtained the 7-[6,8-bis-(ethylthio)octanoylamino]cephalosporanic acid in equally good yield.

EXAMPLE 3

*Preparation of [7-6,8-bis-(benzylthio)octanoylamino]cephalosporanic acid*

The procedure of Example 1 is repeated, substituting an equimolecular amount of 6,8-bis-(benzylthio)octanoyl azide for the 6,8-bis-(methylthio)octanoyl chloride employed in that example. There is thus obtained the 7-[6,8 - bis - (benzylthio)-octanoylamino]cephalosporanic acid.

EXAMPLE 4

*Preparation of 7-(5,8-dithiooctanoylamino)-cephalosporanic acid*

In place of the 6,8-bis-(methylthio)octanoyl chloride of Example 1, there is employed an equimolecular quantity of p-nitrophenyl 5,8-dithiooctanoate whereby the 7-(5,8-dithiooctanoylamino)cephalosporanic acid is obtained in equally good yield.

EXAMPLE 5

*Preparation of 7-(6,8-dithiooctanoylamino)-cephalosporanic acid*

In the manner described in Example 1, treatment of 7-aminocephalosporanic acid with 6,8-dithiooctanoyl chloride produce the 7-(6,8-dithiooctanoylamino)cephalosporanic acid.

EXAMPLE 6

*Preparation of 7-[6,8-bis-(methylthio)octanoylamino]-3-(1-pyridylmethyl)-3-cephem-4-carboxylic acid betaine*

One gram of the sodium salt of 7-[6,8-bis-(methylthio)-octanoylamino]cephalosporanic acid and 8 ml. of pyridine was dissolved in 50 ml. of water, which was adjusted to pH 6 with acetic acid, and stored under nitrogen for 3 days at 37° C. The solution was evaporated to dryness and the residue was triturated with acetone to give the product.

EXAMPLE 7

*Preparation of 7-(6,8-dithiooctanoylamino)-3-(1-pyridylmethyl)-3-cephem-4-carboxylic acid betaine*

One gram of the sodium salt of 7-(6,8-dithiooctanoylamino)cephalosporanic acid and 8 ml. of pyridine was dissolved in 50 ml. of water, which was adjusted to pH 6 with acetic acid, and stored under nitrogen for 3 days at 37° C. The solution was evaporated to dryness and the residue was triturated with acetone to give the product.

EXAMPLE 8

*Preparation of 7-(2-methyl-4,m-dithianepentanoylamino)cephalosporanic acid*

In the manner described in Example 1, treatment of 7-aminocephalosporanic acid with 2-methyl-4,m-dithianepentanoyl chloride produces the 7-(2-methyl-4,m-dithianepentanoylamino)-cephalosporanic acid in equally good yield.

What is claimed is:

1. A compound selected from the group consisting of those of the formulae:

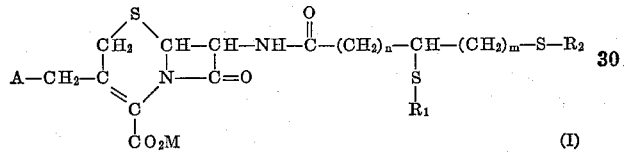

(I)

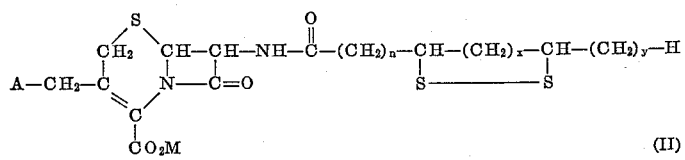

(II)

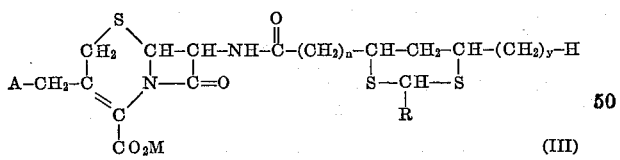

(III)

wherein R is lower alkyl, $R_1$ and $R_2$ are each selected from the group consisting of lower alkyl and phenyl lower alkyl, $n$ has a value selected from the group consisting of 3 and 4, $m$ has a value selected from the group consisting of 2 and 3, $x$ has a value selected from the group consisting of 1 and 2, $y$ has a value selected from the group consisting of 0 and 1, A is selected from the group consisting of acetoxy and N-pyridinium and M is selected from the group consisting of hydrogen, pharmaceutically acceptable non-toxic cations and an anionic charge when A is N-pyridinium.

2. A compound according to claim 1, Formula (I), wherein $R_1$ and $R_2$ are methyl, $n$ is 4, $m$ is 2, A is acetoxy and M is hydrogen.

3. A compound according to claim 1, Formula (I), wherein $R_1$ and $R_2$ are methyl, $n$ is 4, $m$ is 2, A is N-pyridinium and M is an anionic charge.

4. A compound according to claim 1, Formula (I), wherein $R_1$ and $R_2$ are ethyl, $n$ is 4, $m$ is 2, A is acetoxy and M is hydrogen.

5. A compound according to claim 1, Formula (I), wherein $R_1$ and $R_2$ are benzyl, $n$ is 4, $m$ is 2, A is acetoxy and M is hydrogen.

6. A compound according to claim 1, Formula (II), wherein $n$ is 3, $x$ is 2, $y$ is 0, A is acetoxy and M is hydrogen.

7. A compound according to claim 1, Formula (II), wherein $n$ is 4, $x$ is 1, $y$ is 0, A is acetoxy and M is hydrogen.

8. A compound according to claim 1, Formula (II), wherein $n$ is 4, $x$ is 1, $y$ is 0, A is N-pyridinium and M is an anionic charge.

9. A compound according to claim 1, Formula (III), wherein R is methyl, $n$ is 4, $y$ is 0, A is acetoxy and M is hydrogen.

10. A compound according to claim 1, Formula (III), wherein R is methyl, $n$ is 4, $y$ is 0, A is N-pyridinium and M is an anionic charge.

No references cited.

NICHOLAS S. RIZZO, *Primary Examiner.*